(12) United States Patent
Okimoto et al.

(10) Patent No.: US 7,870,938 B2
(45) Date of Patent: Jan. 18, 2011

(54) COLLECTOR SHOE DEVICE

(75) Inventors: Fumio Okimoto, Nagoya (JP); Isao Naruse, Nagoya (JP); Yasuki Nakakura, Nagoya (JP); Yasutaka Terada, Nagoya (JP); Nobuo Yamanaka, Nagoya (JP); Toshio Shikama, Sayama (JP); Junichi Fujiwara, Sayama (JP); Kenichi Kitazawa, Sayama (JP)

(73) Assignee: Central Japan Railway Company (JP)

( * ) Notice: Subject to any disclaimer, the term of this patent is extended or adjusted under 35 U.S.C. 154(b) by 148 days.

(21) Appl. No.: 11/887,887

(22) PCT Filed: Apr. 6, 2006

(86) PCT No.: PCT/JP2006/307376
§ 371 (c)(1),
(2), (4) Date: Dec. 10, 2008

(87) PCT Pub. No.: WO2006/109697
PCT Pub. Date: Oct. 19, 2006

(65) Prior Publication Data
US 2009/0211861 A1 Aug. 27, 2009

(30) Foreign Application Priority Data
Apr. 8, 2005 (JP) .............................. 2005-112400

(51) Int. Cl.
*B60L 5/00* (2006.01)
(52) U.S. Cl. ...................... 191/59.1; 191/59; 191/45 R
(58) Field of Classification Search ............... 191/45 R, 191/47, 50, 57, 58, 59, 59.1
See application file for complete search history.

(56) References Cited

U.S. PATENT DOCUMENTS 2,262,374 A * 11/1941 Schaake ................... 191/59.1

(Continued)

FOREIGN PATENT DOCUMENTS

JP 50-62804 6/1975

(Continued)

*Primary Examiner*—S. Joseph Morano
*Assistant Examiner*—Jason C Smith
(74) *Attorney, Agent, or Firm*—Finnegan Henderson Farabow Garrett & Dunner LLP

(57) ABSTRACT

An object of the present invention is to realize a structure able to well retain contact performance between an overhead line and a slider 7b, across the entire lengthwise direction of the slider 7b. The slider 7b formed of slider elements 34a and 34b divided in the crosswise direction of a vehicle, is supported on the upper surface of a slider support body 9. A center support member 12 forming the slider support body 9 is elastically deformed downward in a concaved shape across the longitudinal direction, due to a load applied due to contact between the overhead lines and the slider 7b. Also, together with this, both ends of the center support member 12 are supported on a shoe body 3a so as to allow free oscillation via the respective end section support members 13. As a result, even if the overhead lines are positioned on both of the end sections in the lengthwise direction of this slider 7b, the slider 7b is able to track the movement of the overhead lines due to elastic deformation of the center support member 12 and to the rising and falling of the center support member 12, and hence the above object can be achieved.

4 Claims, 14 Drawing Sheets

U.S. PATENT DOCUMENTS

| | | | | |
|---|---|---|---|---|
| 2,304,058 A | * | 12/1942 | Arnold | 191/59.1 |
| 2,508,531 A | * | 5/1950 | Mosley | 191/59.1 |
| 2,834,841 A | * | 5/1958 | Waugh | 191/59.1 |
| 2,855,470 A | * | 10/1958 | Waugh | 191/59.1 |
| 3,830,990 A | * | 8/1974 | Gray | 191/55 |
| 4,375,195 A | * | 3/1983 | Tsuboi | 104/246 |
| 5,176,230 A | * | 1/1993 | Odot | 191/87 |
| 5,193,656 A | * | 3/1993 | Hoffmann et al. | 191/49 |
| 5,263,562 A | * | 11/1993 | Hoffmann et al. | 191/45 R |
| 5,351,794 A | * | 10/1994 | Deutzer | 191/55 |
| 5,505,283 A | * | 4/1996 | Rumsey | 191/59.1 |
| 5,657,842 A | * | 8/1997 | Krenkel et al. | 191/45 R |
| 5,878,854 A | * | 3/1999 | Siessl et al. | 191/59.1 |
| 6,006,876 A | * | 12/1999 | Beale et al. | 191/59.1 |
| 6,009,987 A | * | 1/2000 | Siessl et al. | 191/59.1 |
| 6,286,646 B1 | * | 9/2001 | Van Zijverden et al. | 191/45 R |
| 6,360,860 B1 | * | 3/2002 | van Zijverden et al. | 191/45 A |
| 6,418,397 B1 | * | 7/2002 | Brand et al. | 702/168 |
| 6,474,455 B1 | * | 11/2002 | Blaschko et al. | 191/45 R |
| 7,188,716 B2 | * | 3/2007 | Lamschick | 191/49 |
| 2009/0211861 A1 | * | 8/2009 | Okimoto et al. | 191/59.1 |

FOREIGN PATENT DOCUMENTS

| | | |
|---|---|---|
| JP | 53-121608 | 9/1978 |
| JP | 9-182202 | 7/1997 |
| JP | 3297355 | 4/2002 |
| JP | 2005-160266 | 6/2005 |
| JP | 2006-87213 | 3/2006 |

* cited by examiner

Prior Art

COLLECTOR SHOE DEVICE

TECHNICAL FIELD

The present invention relates to an improvement in a collector shoe device used in a condition of being installed on a roof of a railway vehicle, such as a super express railway vehicle that travels at a high speed, to collect electric power from an overhead line, and it is to improve the tracking performance of a slider on the overhead line and to ensure contact performance between this overhead line and slider (performance in retaining an appropriate state of contact).

BACKGROUND ART

Above a roof of a railway vehicle, there is a collector shoe supported via a pantograph to take in electric power from an overhead line. Specifically, a slider, which is supported on the top surface of the collector shoe, and which is made from conductive material such as sintered metal, is elastically pressed against a lower edge of the overhead line to take in electric power from this overhead line to the vehicle. Among such pantograph and collector shoe devices, the structure of those used in high speed railway vehicles such as a super express railway vehicle differs from the structure of those used in a conventional railway vehicles, in giving consideration to reduction of airflow noise generated when the vehicle is traveling, and the tracking performance on the overhead line.

FIG. 19 shows a collector shoe device disclosed in Patent Document 1 among the collector shoe devices that have been developed for a high speed railway vehicle in consideration of such points. In the case of this conventional structure, on an upper end section of an upper frame 1 that constructs the pantograph, there is supported a middle section of a ceiling pipe 2, and around this ceiling pipe 2, a hollow shoe body 3 is elastically supported allowing some slight free rising and falling movement. Accordingly, within this shoe body 3, there are provided linear shafts 4, springs 5, and conducting wires 6 for conducting electricity. A slider 7 is installed on a top surface of the shoe body 3.

As a result of such structure, even when driven at a high speed, air does not flow around the ceiling pipe 2, the linear shafts 4, the springs 5, and the conducting wires 6, allowing a corresponding reduction in airflow noise. Moreover, in the case where the vertical position of the overhead line changes finely, the shoe body 3 shifts with respect to the ceiling pipe 2 to track the change of the overhead line position. In other words, this ceiling pipe 2 does not need to shift in the vertical direction. Therefore, the inertial mass of the portion that shifts in the vertical direction for tracking the overhead line can be kept low, and the tracking performance of this portion on the overhead line can be made excellent. If the vertical position of the overhead line changes significantly, the upper frame 1 is raised and lowered to allow the slider 7 to track this overhead line, A ceiling pipe in the field of collector shoe devices for railway vehicles refers to a member in a support frame form arranged in the crosswise direction of the vehicle on the top end section of a pantograph. Conventionally it was actually formed in a pipe shape (in the case of a rhombic shaped pantograph that was used for a conventional railway vehicle). However, it is not limited to a pipe shape (especially for a high speed railway vehicle).

In the case of the conventional structure disclosed in Patent Document 1 mentioned above, compared to its prior art structure, airflow noise can be reduced and tracking performance on the overhead line can be improved. However, in the point of improving the tracking performance on the overhead line, there is still scope for improvement. Specifically, in the conventional structure, when the vertical position of the overhead line finely changes, the shoe body 3 and a pair of frame rods 8 on the right and left fixed on this shoe body 3 rise and fall together with the entire slider 7. Therefore it is inevitable that the inertial mass is great despite the ceiling pipe 3 and the upper frame 1 not being included. Accordingly, in the case of further increasing the speed of the railway vehicle, it is possible that the contact performance between the top surface of the slider 7 and the overhead line (the performance of retaining an appropriate contact condition) decreases. If the elastic force of a spring assembled in the pantograph to give the upper frame 1 standing direction elasticity, and the elastic force of the respective springs 5 for giving the ceiling pipe 2 a rising direction elastic force with respect to the shoe body 3, are increased, the tracking performance can be improved. However, in this case, since the contact surface pressure between the top surface of the slider 7 and the overhead line becomes greater, resulting in significant wear in the slider 7 and the overhead line, it is not preferable.

On the other hand, in order to improve the tracking performance on the overhead line, a structure exaggeratedly shown in FIG. 20 may be considered. Specifically, a slider 7a that comes in contact with the overhead line, and a slider support plate that supports this slider 7a from below elastically deform (bend) in a concave shape due to a load applied due to the contact with the overhead line. Alternatively, the slider 7a comprises a plurality of slider elements divided in the crosswise direction of the vehicle and arranged in series in this crosswise direction, and a slider support plate that supports these respective slider elements elastically deforms as described above. A structure in which both of the lengthwise direction end sections of this slider 7a or the slider support plate are supported on the shoe body not shown in the drawing) may be considered. In such a construction, when the vertical position of the overhead line finely shifts, the slider 7a and the slider support plate elastically deform in response to the fine vertical movement of this overhead line, and contact performance between the overhead line and the slider 7a can be well retained. However, in the case of such a structure shown in FIG. 20, since both of the lengthwise direction end sections of the slider 7a or the slider support plate are supported on the shoe body, an elastic deformation amount (bend amount) in the vertical direction in both of the end sections of this slider 7a or the slider support plate cannot be easily ensured. That is to say, a vertical direction shift (stroke) amount of the top surfaces of both of the end sections of this slider 7a due to the elastic deformation inevitably becomes smaller. Because of this, in the case where the overhead line is positioned in the proximity of both of the end sections of the slider 7a, the effect of improvement in a tracking performance of this slider or the slider support plate due to elastic deformation cannot be easily obtained. In other words, in a state where the overhead line is positioned in the proximity of both of the lengthwise direction end sections of the slider 7a, when the overhead line finely shifts in the vertical direction, the shoe body and the upper frame of the pantograph that supports this shoe body are raised and lowered together with the slider 7a. Therefore, the inertial mass is great as is the case with the structure shown in FIG. 19 mentioned above, and there is a possibility that the contact performance at both of the end sections of this slider 7a cannot be well retained.

Patent Document 1: Japanese Patent Publication No. 3297355

DISCLOSURE OF THE INVENTION

Problem to be Solved by the Invention

The present invention takes the circumstances mentioned above into consideration and realizes a structure able to well retain contact performance between an overhead line and a slider, across the entire lengthwise direction of the slider.

Means for Solving the Problems

A collector shoe device of the present invention is provided with: a shoe body supported on an upper end section of a pantograph in a crosswise direction of a vehicle; a slider support body arranged above the shoe body in the crosswise direction of the vehicle along the shoe body; and a slider, which is supported and fixed on a top surface of the slider support body, and the top surface of which comes in contact with an overhead line.

The slider support body among these comprises a center support member that is long in the crosswise direction of the vehicle, and a pair of end section support members arranged on both of the lengthwise direction end sections of the center support member.

Moreover, the center support member among these elastically deforms downward in the lengthwise direction due to a load applied due to the contact between the overhead line and the slider. Also, elastic deformation in this way allows the top surface of the slider to shift in the vertical direction with respect to the shoe body.

Furthermore, by having both of the end sections of the center support member supported so as to allow free oscillation on the shoe body via the respective end section support members, the entire center support member can freely rise and fall with respect to the shoe body.

Effect of the Invention

According to a collector shoe device of the present invention constructed as described above, contact performance between an overhead line and a slider can be well retained across the lengthwise direction of this entire slider. That is to say, when the vertical position of the overhead line finely changes, the top surface of the slider shifts in the vertical direction in response to the movement of the overhead line due to elastic deformation of the center support member that constructs the slider support body. Moreover, at the same time, the entire center support member supported so as to allow free oscillation on a shoe body by a pair of end section support members rises and falls with respect to this shoe body as necessary. As a result, not only in the case where the overhead line is positioned in the lengthwise center of the slider, but also in the case where it is positioned on both of the end sections in the lengthwise direction of this slider, the slider is able to track the movement of the overhead line due to elastic deformation of the center support member and to the rising and falling of the center support member with respect to the shoe body. Furthermore, when the slider tracks the movement of the overhead line in this way, the shoe body and an upper frame of a pantograph that supports this shoe body are not required to rise and fall together with the slider. Therefore, the inertial mass does not become greater. As a result, the tracking performance of the slider on the overhead line can be improved while retaining good contact performance between the overhead line and the slider.

BEST MODE FOR CARRYING OUT THE INVENTION

Figure 1:
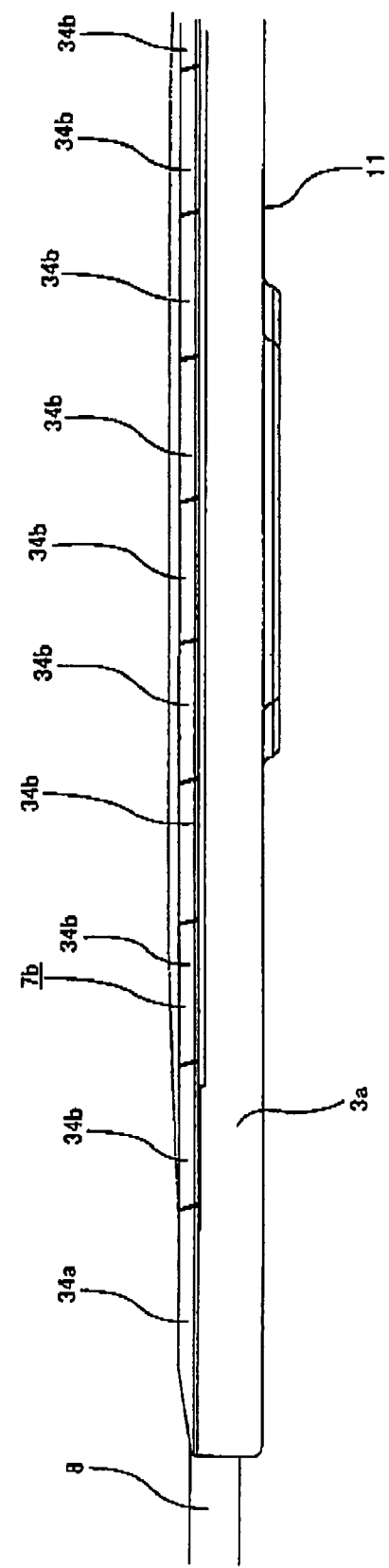
FIG. 1 is a partial front view showing an embodiment 1 of the present invention seen from a traveling direction of a railway vehicle.
Figure 2:
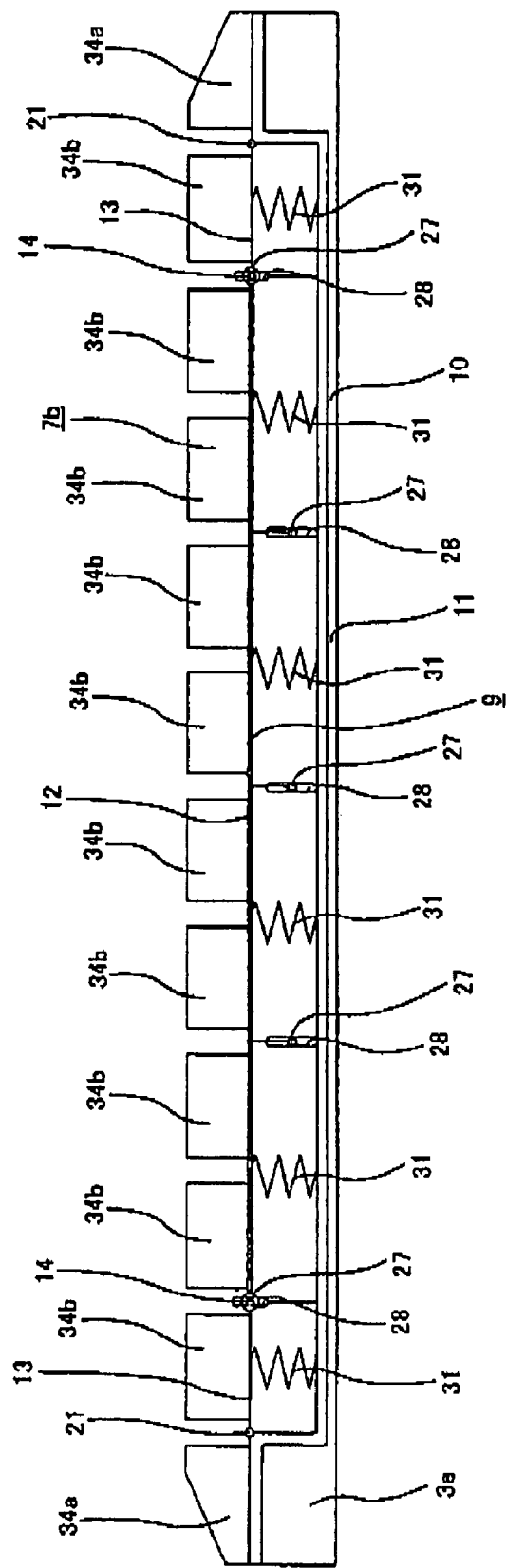
FIG. 2 is a schematic front view of the same.

When carrying out the present invention, it is preferable that between both of the center support member and respective end section support members that construct a slider support body, and the shoe body, there are respectively provided elastic members that push the center support member and the respective end section support members upward.

According to such a construction, by adjusting the elastic force of the respective elastic members, a relationship between a load applied due to contact between an overhead line with the slider, and an elastic deformation amount and a rising and falling amount of the center support member, is further finely regulated, and a state of contact between the overhead line and the slider is better retained.

Moreover, when carrying out the present invention, it is preferable that the slider comprise a plurality of slider elements that are divided in a crosswise direction of a vehicle and are arranged in series in this crosswise direction. Furthermore, the respective slider elements are supported and fixed on the top surfaces of the center support member and the respective end section support members that constrict the slider support member. In this case, it is preferable that a plurality of the slider elements (not necessarily all of the slider elements that construct the slider) be supported and fixed on a top surface of the center support member. Moreover, due to the elastic deformation of this center support member, the respective top surfaces of the respective slider elements are shifted in a vertical direction with respect to the shoe body. In the case where a single slider element (not a plurality thereof) is supported and fixed on the top surface of the center support member, a slider element that at least elastically deforms together with the center support is used.

According to such a construction, the slider elements supported and fixed on the top surface of the center support member and the slider elements supported and fixed on the top surface of each of the end section support members can be independently shifted, and a reduction in inertial mass can be achieved when the slider tracks the movement of the overhead line. Furthermore, in the case where a plurality of the slider elements are supported and fixed on the top surface of the center support member, even if the respective slider elements do not elastically deform, the respective top surfaces of the respective slider elements can be shifted in the vertical direction with respect to the shoe body due to the elastic deformation of the center support member.

Moreover, when carrying out the present invention, it is preferable that both of the end sections of the center support member and an inner end section, in the crosswise direction of the vehicle, of each of the end section support members be connected by a first connecting shaft arranged in the traveling direction of the vehicle, allowing them to oscillate and shift freely. Furthermore, together with this, a support frame supported on the shoe body and similarly an outer end section of each of the end section support members are similarly connected by a second connecting shaft allowing them to oscillate and shift freely. Moreover, in this case, it is preferable that on the center support member there be provided a rising and falling shaft in parallel with the first and second connecting shafts, this rising and falling shaft being movably fitted so as to rise and fall freely in a guide hole of the support frame supported by the shoe body.

According to such as construction, the orientation of the slider support body constructed by the center support member and the respective end section support members can be stabilized, while the center support member can rise and fall freely with respect to the shoe body. Accordingly, a state of contact between the slider supported and fixed on the top surface of this slider support body and the overhead line can be further stabilized.

Embodiment

FIG. 1 to FIG. 18 show an embodiment of the present invention. A collector shoe device of the present embodiment is provided with a shoe body 3a, a slider support body 9, and a slider 7b.

The shoe body 3a among these is formed into a ship shape either by machining or die-cast molding aluminum alloy material, and is supported on a top end section, in the crosswise direction of a railway vehicle, of a pantograph frame, not shown in the drawing. Between these shoe body 3a and pantograph frame, there is provided a linkage mechanism not shown in the drawing, which is conventionally well known in the technical field of a pantograph for a railway vehicle, so that the top surface of the shoe body 3a stays in parallel with a roof surface of the vehicle regardless of whether the pantograph frame is standing or collapsed.

Figure 3:
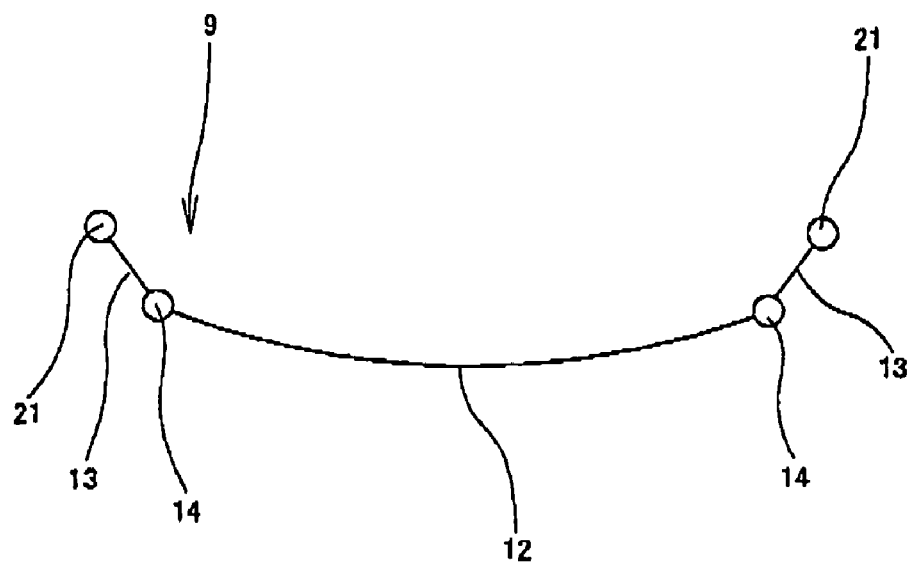
FIG. 3 is an exaggerated front view showing a slider support body in a state of being elastically deformed due to a load applied by an overhead line.
Figure 4:
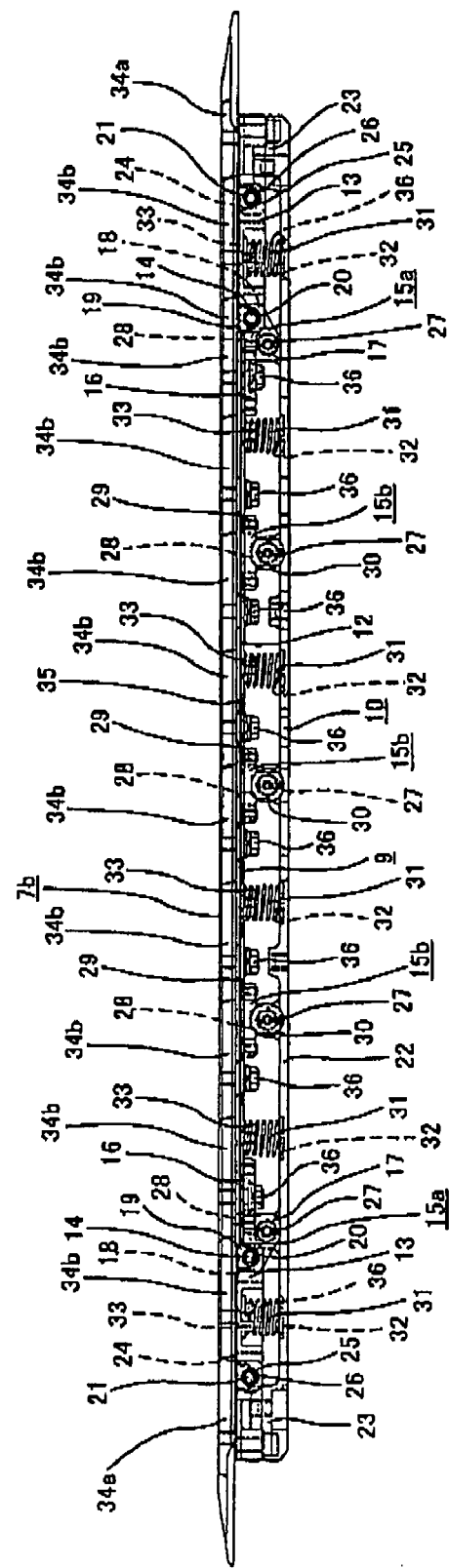
FIG. 4 is a front view showing a state of being detached from a shoe body.
Figure 5:
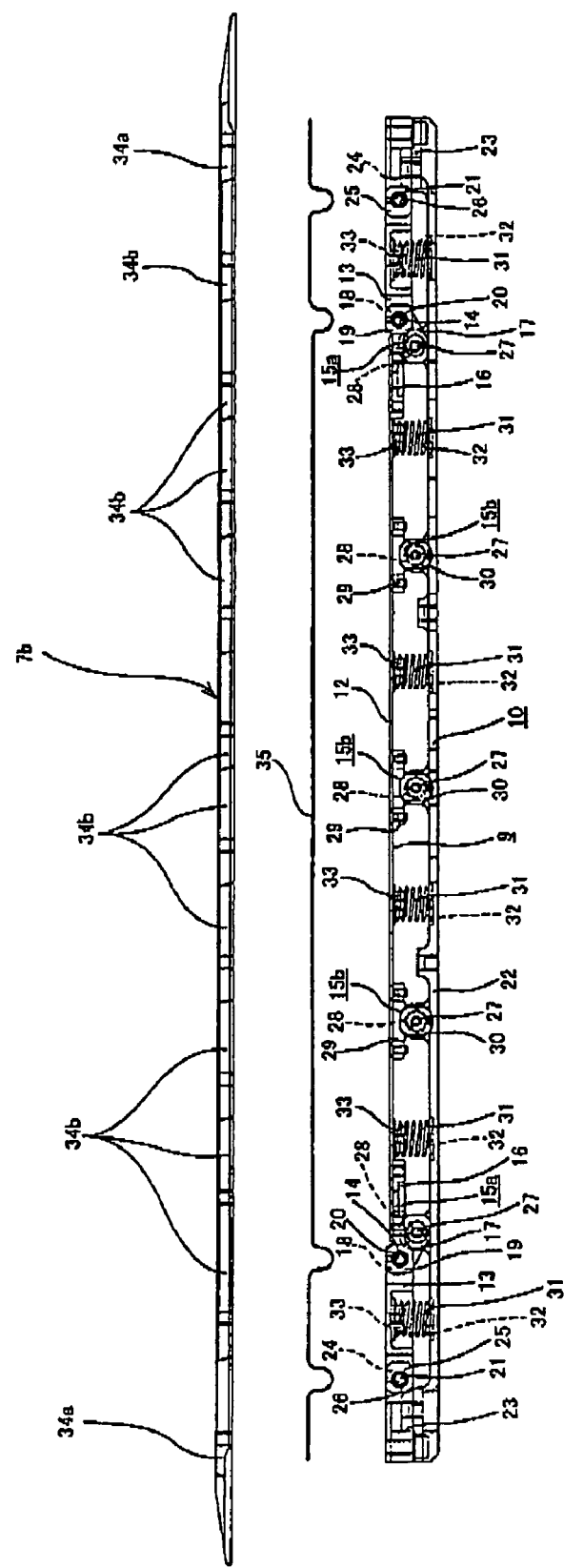
FIG. 5 is a drawing similar to that in FIG. 4 showing a state with a slider and a conducting strip removed.
Figure 6:
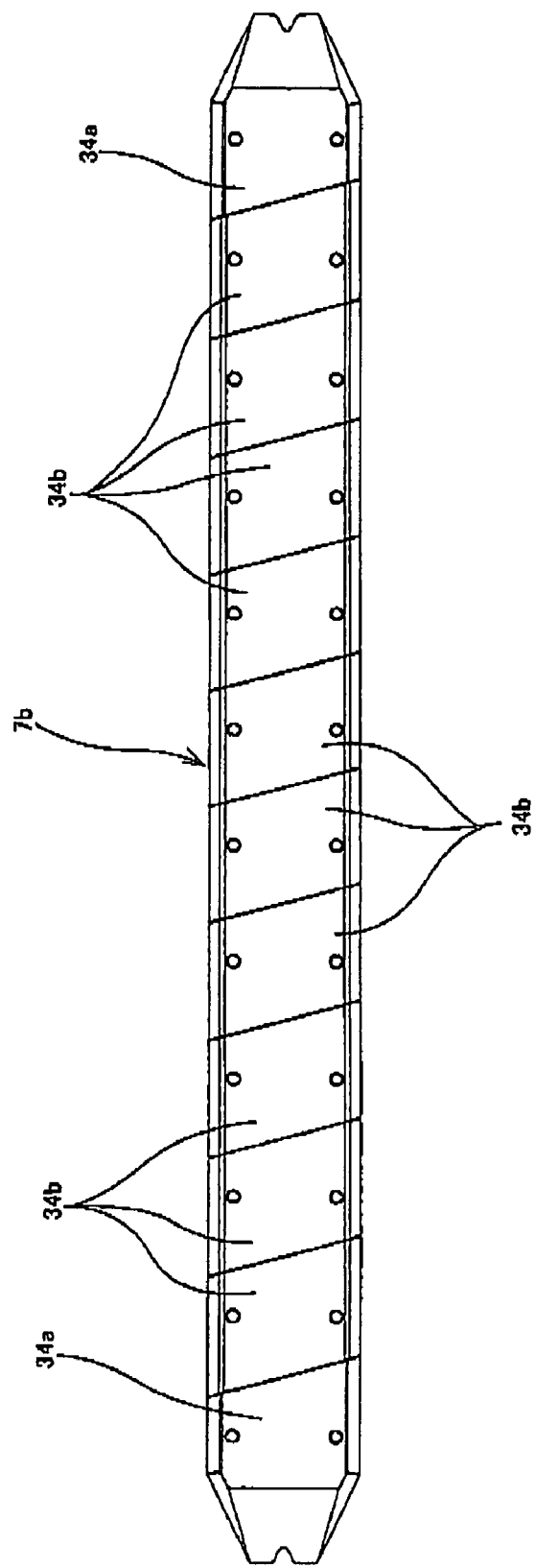
FIG. 6 is a top view of the slider only.
Figure 7:
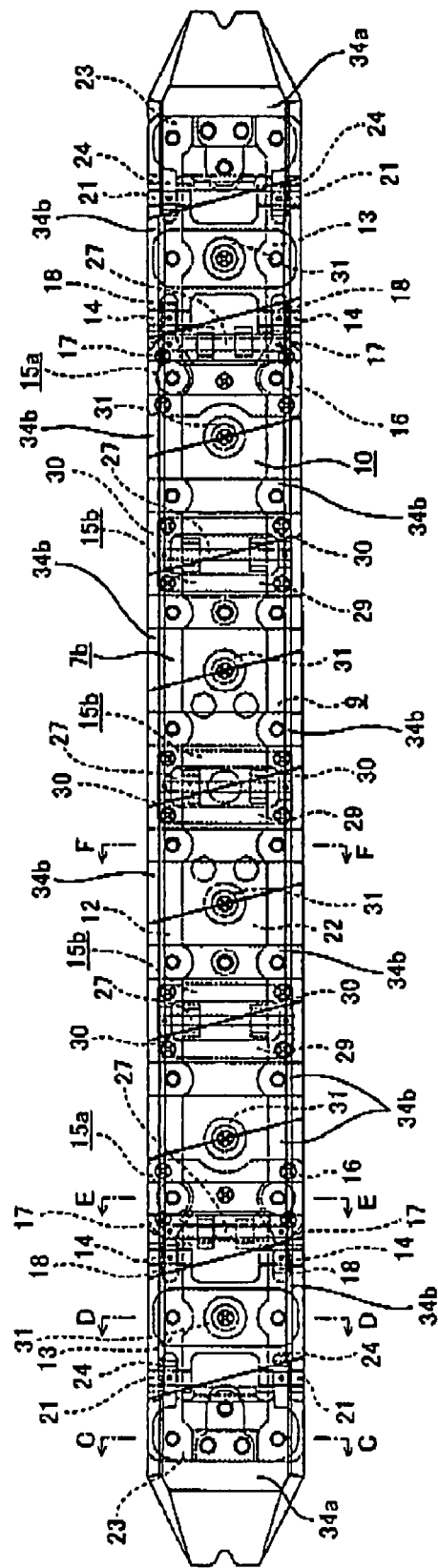
FIG. 7 is a top view of FIG. 4.
Figure 8:
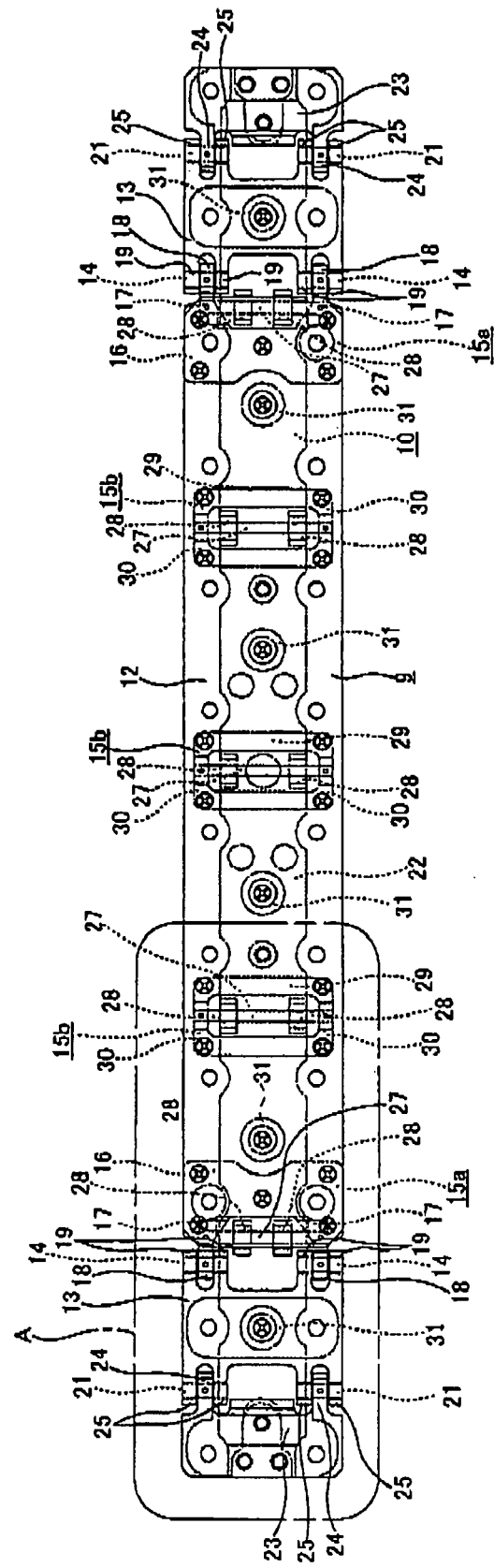
FIG. 8 is a view seen from the same direction of FIG. 7 with the slider omitted.
Figure 9:
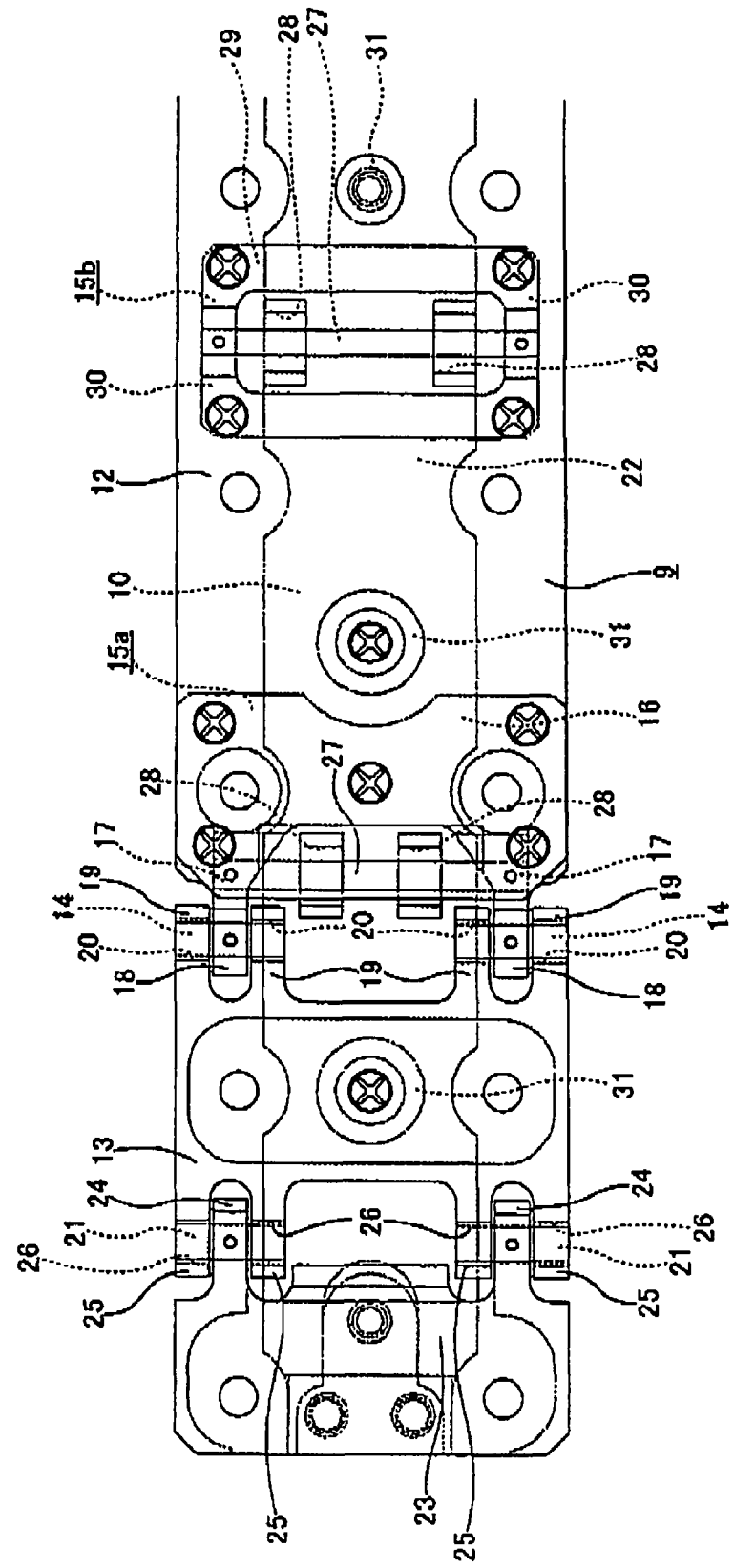
FIG. 9 is an enlarged drawing of a section A of FIG. 8.
Figure 10:
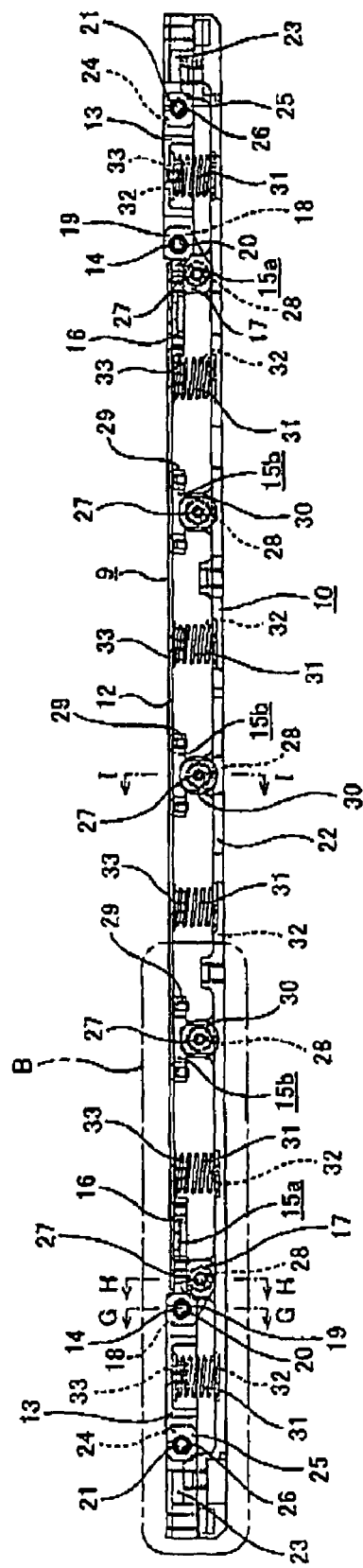
FIG. 10 is a bottom view of FIG. 8.
Figure 11:
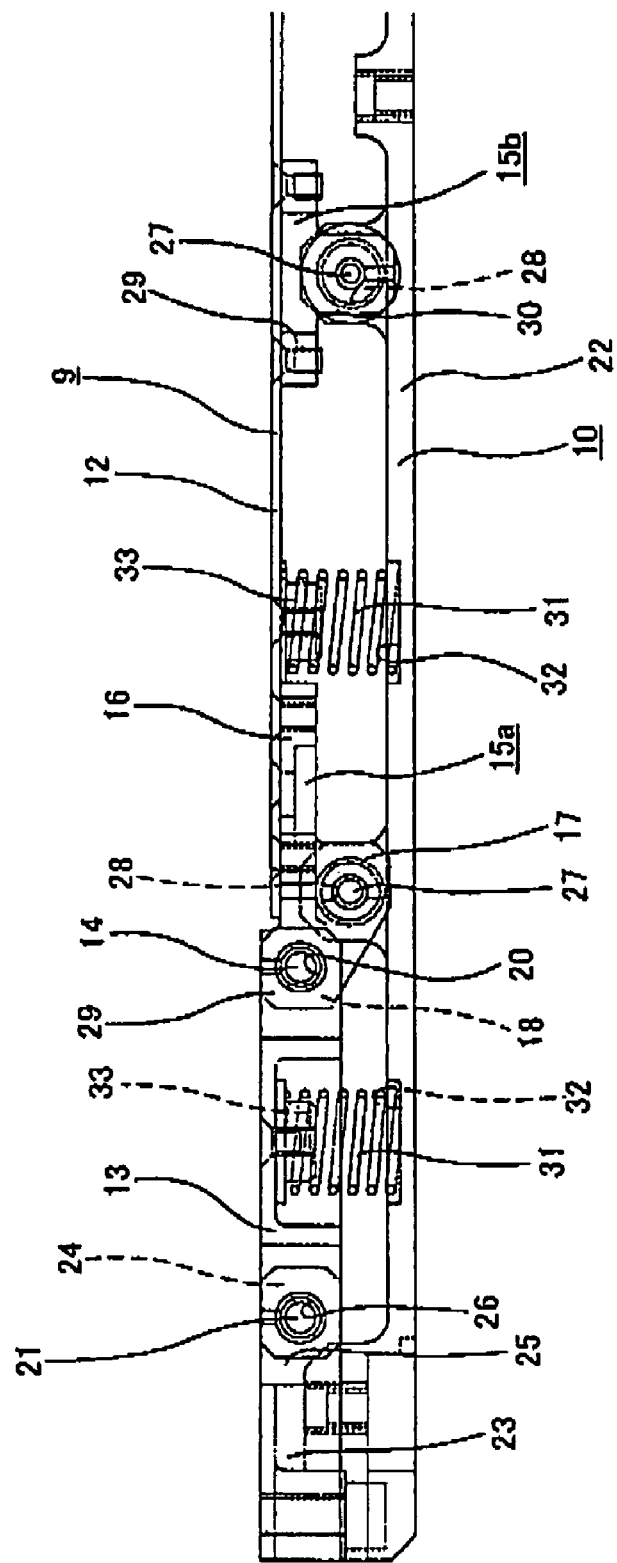
FIG. 11 is an enlarged drawing of a section B of FIG. 10.
Figure 12:
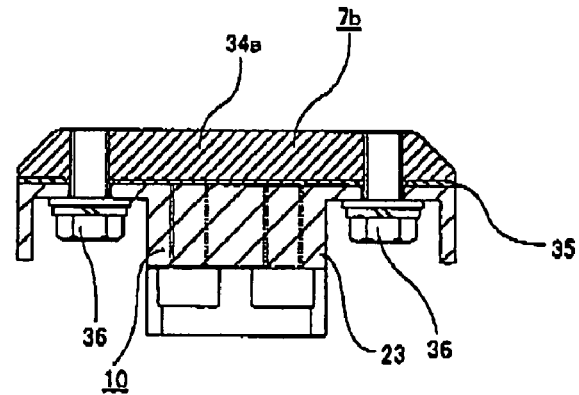
FIG. 12 is a sectional view taken along the line C-C in FIG. 7.
Figure 13:
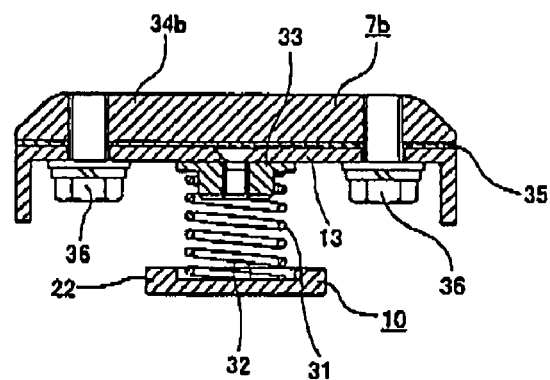
FIG. 13 is a sectional view taken along the line D-D in FIG. 7.
Figure 14:
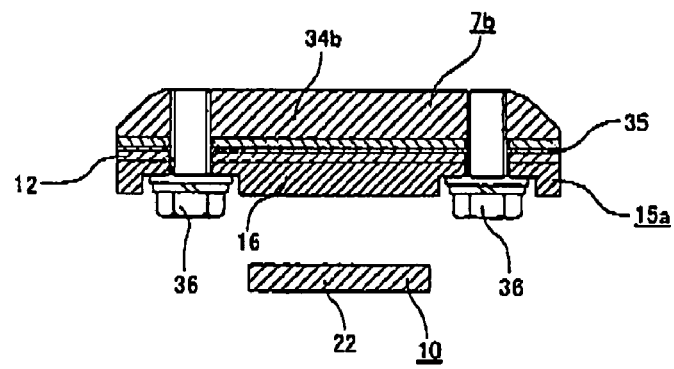
FIG. 14 is a sectional view taken along the line E-E in FIG. 7.
Figure 15:
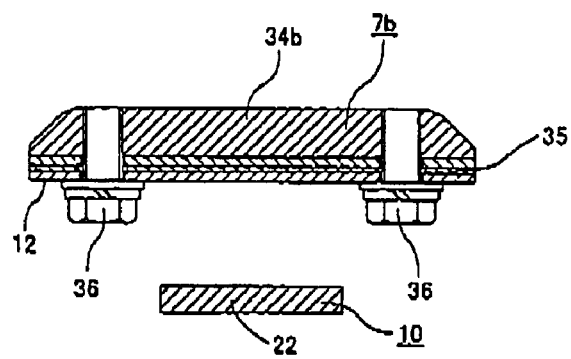
FIG. 15 is a sectional view taken along the line F-F in FIG. 7.
Figure 16:
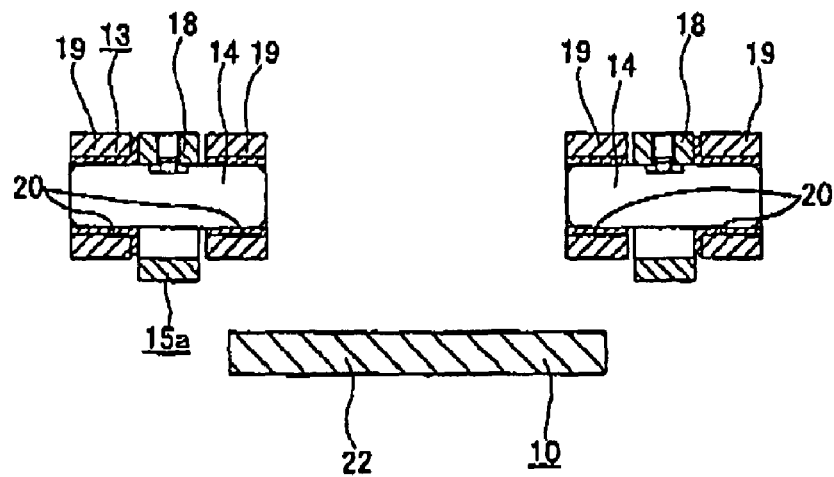
FIG. 16 is a sectional view taken along the line G-G in FIG. 10.
Figure 17:
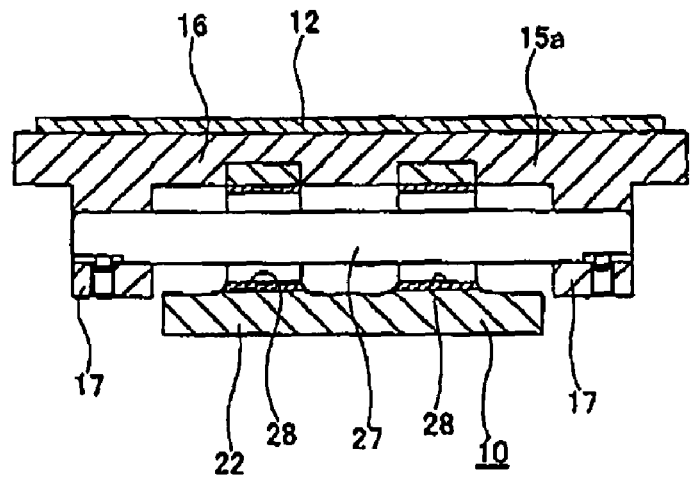
FIG. 17 is a sectional view taken along the line H-H in FIG. 10.
Figure 18:
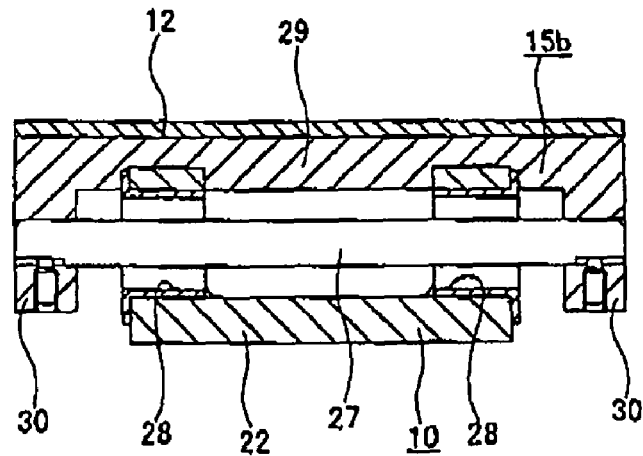
FIG. 18 is a sectional view taken along the line I-I in FIG. 10.
Figure 19:
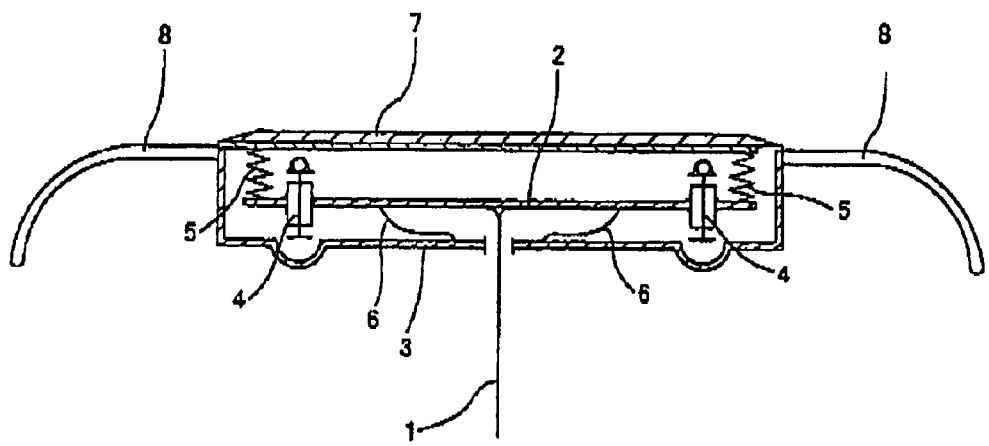
FIG. 19 is a schematic sectional view showing an example of a conventional structure seen from a traveling direction of a railway vehicle.

Moreover, the slider support body 9 is housed in the shoe body 3a via a support frame 10, formed either by machining or die-cast molding aluminum alloy material. The slider support body 9 in a state of being housed in the shoe body 3a as described above is disposed, together with the support frame 10, above a bottom plate section 11 of this shoe body 3a, along this shoe body 3a, in the crosswise direction of the railway vehicle. Such a slider support body 9 comprises a single center support member 12 and a pair of end section support members 13. Among these, the center support member 12 is made of a metallic plate such as spring steel plate having elasticity, and has the shape of a spring plate (flexible plate), long in the crosswise direction of the vehicle. Therefore, as is schematically shown in FIG. 3, the center support member 12 elastically deforms (bends) downward in a concaved shape (or in a way an upward convex projection amount becomes smaller) across the lengthwise direction due to a load applied in the vertical direction.

Moreover, the respective end section support members 13 are made either by machining or die-cast molding aluminum alloy material, and are disposed on both of the lengthwise direction end sections of the center support member 12. By supporting both ends of the center support member 12 so as to allow free oscillation via the respective end section support members 13 on the support frame 10, which is supported and fixed on the bottom plate section 11 of die shoe body 3a, the center support member 12 can rise and fall freely with respect to the shoe body 3a.

To achieve this, both of the end sections of the center support member 12 and the inner end sections, in the crosswise direction of the vehicle, of the respective end section support members 13 are connected, so as to allow free oscillation, by first connecting shafts 14 arranged in the traveling direction of the vehicle. In the case of the present embodiment, a pair of support pieces 15a are fixed on both of the end sections of the center support member 12, and the first connecting shafts 14 are supported on these respective support pieces 15a. Such support pieces 15a are provided with: a flat plate shaped support plate 16 that fixes both of the end sections of the center support member 12; a pair of hanging wall sections 17 that bend downward at both ends, in the traveling direction of the vehicle, of this support plate section 16; and a pair of arm sections 18 that extend from an outer end, in the crosswise direction of the vehicle, of both of these hanging wall sections 17 toward the respective end section support members 13. The middle section of the connecting shaft 14 is supported respectively on each of the arm sections 18 among these.

On the other hand, on the inner end sections, in the crosswise direction of the vehicle, of the respective end section support members 13 there are provided tongue pieces 19 in a state of overlapping, in the traveling direction of the vehicle, the respective arm sections 18 (a state of sandwiching the respective arm sections 18). Each of these tongue pieces 19 is provided with a support hole 20 in a position aligned with the first connecting shaft 14. By movably fitting (loosely inserting) both of the end sections of the first connecting shaft 14 into the respective support holes 20, the center support member 12 and the respective end section support members 13 are connected so as to allow free oscillation and shift. Furthermore, the outer end sections, in the crosswise direction of the vehicle, of the respective end section support members 13 (end sections on the side opposite to the center support member 12 in the crosswise direction of the vehicle) and both of the end sections of the support frame 10 supported on the shoe body 3a are connected, so as to allow free oscillation and shift, by a second connecting shaft 21 arranged in the traveling direction of the vehicle.

In the case of the present embodiment, on both of the end sections of the support frame 10, there are provided support wall sections 23 that project upward from a bottom plate section 22 that constructs this support frame 10. On the inner surface, in the crosswise direction of the vehicle, of these respective support wall sections 23, there is provided a pair of arm sections 24 extending toward the outer end section of the respective end section support members 13, and the middle sections of the second connecting shafts 21 are respectively supported on the respective arm sections 24. Moreover, on the outer end sections of the respective end section support members 13, there are respectively provided tongue pieces 25 in a state of overlapping, in the traveling direction of the vehicle, the respective arm sections 24 (a state of sandwiching the respective arm sections 24). Each of these tongue pieces 25 is provided with a support hole 26 in a position aligned with the first connecting shaft 21. By movably fitting (loosely inserting) both of the end sections of the second connecting shaft 21 into the respective support holes 26, the respective end section support members 13 are connected to the support frame 10 so as to allow free oscillation and shift.

Moreover, on the center support member 12, there are provided rising and falling shafts 27 in parallel with the first and second connecting shafts 14 and 21, and these respective rising and falling shafts 27 are respectively movably fitted, so as to rise and fall freely, in guide holes 28 provided in the support frame 10. In the case of the present embodiment, in five lengthwise direction positions along the top surface of the bottom plate section 22 of the support frame 10, the respective guide holes 28 are provided distanced from each other at substantially equal intervals. Moreover, at the same time, the respective rising and falling shafts 27 are engaged with the support pieces 15a fixed on both of the end sections of the center support member 12, and with separate support pieces 15b fixed in positions aligned with the respective guide holes 28 on the bottom surface of the center support member 12.

Among the respective support pieces 15a and 15b, the separate support piece 15b that is supported and fixed on the bottom surface of the center support member 12 is provided with a rectangular frame shaped support frame 29 and a pair of hanging wall sections 30 that bend downward from both of the ends, in the traveling direction of the vehicle, of this support frame section 29. Both of the end sections of the rising and falling shaft 27 are respectively supported and fixed on such hanging wall sections 30 of the separate support piece 15b and on the banging wall sections 17 of the respective support pieces 15a fixed on both of the end sections of the center support member 12. In a state where the middle section of each of these rising and falling shafts 27 has been loosely inserted into each of the guide holes 28, the center support member 12 can freely rise and fall with respect to the shoe body 3a and the respective end section support members 13 can freely oscillate about the second connecting shaft 21. The inner diameter of the respective guide holes 28 is greater than the outer diameter of the respective rising and falling shafts 27 within a range for appropriately allowing the center support member 12 to rise and fall. That is to say, by regulating the vertical direction size of the inner diameter of the respective guide holes 28, a rising and falling amount of the center support member 12 is regulated to an appropriate value.

Moreover, between both of the bottom surfaces of the center support member 12 and the respective end section support members 13, and the top surface of the bottom plate section 22 of the support frame 10 supported and fixed on the shoe body 3a, there are respectively provided compression coil springs 31 as elastic members. In the case of the present embodiment, in one portion of the top surface of the bottom plate section 11 of the support frame 10, there are provided circular-shaped or a ring-shaped concave sections 32, into which the lower end sections of the respective compression coil springs 31 are fitted. Furthermore, together with this, on the bottom surfaces of the center support member 12 and the respective end section support members 13, circular shaped or ring shaped convex sections 33 are provided (by screw-fixation) for being externally fitted with the upper end aperture sections of the respective compression coil springs 31.

In a state where the respective compression coil springs 31 are installed in between the respective concave sections 32 and the respective convex sections 33, an elastic force in the upward direction is imparted to the center support member 12 and the respective end section support members 13. In order to prevent an excessive upward shift of these center support member 12 and the respective support members 13 according to this elastic force, the respective rising and falling shafts 27 are loosely fitted in the respective guide holes 28 as described above. Then, according to such as construction, in a state where an upward elastic force is given to the center support member 12 and the respective end section support members 13, they are supported allowing slight free rising and falling (for example, approximately ±3 mm on the inner end section, with respect to the central position, of the end section support member 13, and approximately ±5 mm on the center section of the center support member 12).

As described above, the slider 7b is installed on the top surface of the slider support body 9 installed on the top surface of the shoe body 3a via the support frame 10. In the case of the present embodiment, this slider 7b comprises a plurality of slider elements 34a and 34b (12 elements) that are divided in the crosswise direction of the vehicle and arranged in series in this crosswise direction. These respective slider elements 34a and 34b are supported and fixed by screws 36 inserted from below via a conducting strip 35 described below, with one element apiece respectively disposed on each of the supporting walls 23 provided at each end section of the support frame 10, one element apiece respectively disposed on each of the upper surfaces of the respective end section support members 13, and eight elements respectively disposed on the upper surface of the center support member 12. Therefore, among the respective slider elements 34a and 34b, the respective slider elements 34b supported and fixed on the top surfaces of the center support member 12 and the respective end section support members 13 are allowed to rise and fall slightly and to oscillate freely together with the center support member 12 and the respective end section support members 13.

The top surfaces of such slider elements 34a and 34b are positioned on the same horizontal plane when the railway vehicle is present on a flat surface and the respective center support members 12 and the respective end section support members 13 are present in the neutral position. The ends, in the crosswise direction of the vehicle, of the respective slider elements 34a and 34b are inclined with respect to the traveling direction of this vehicle and are closely opposed to each other having a minute gap therebetween. The reason for such a construction is; so that even in the case where the overhead line is positioned in a non-continuous section of the slider elements 34a and 34b, this overhead line is prevented from sinking into the non-continuous section, and for preventing excessive surface pressure from being applied on the portion where these slider elements 34a and 34b and the overhead line are in friction, to prevent damage to these slider elements 34a and 34b and the overhead line.

Moreover, a conducting strip 35 is held between the bottom surface of the slider 7b on one side, and the top surfaces of the center support member 12 and the respective support members 13 and the top surface of the support wall sections 23 provided on both of the end sections of the support frame 10, on the other side. This conducting strip 35 is a thin plate made of copper or copper alloy metal and one conducting strip 35 alone is provided for a single collector shoe device. Furthermore, a portion in this conducting strip 35 that straddles the center support member 12 and the respective end section support members 13, and a portion in the conducting strip 35 that straddles these respective end section support members 13 and the support wall section 23 of the support frame 10 are bent so as to project downward. By bending them as described above, the bending rigidity of these portions can be made small and expansion and contraction of these portions becomes possible, and a force required to shift the center support member 12 and the respective end section support members 13 relatively in the vertical direction is made small. On one portion of the conducting strip 35 there is connected an end section of a cable, not shown in the drawing, for taking electric power that has been taken in from the overhead line to the vehicle side.

Moreover, the base end sections of a pair of frame rods 8 are fixed on both of the end sections, in the crosswise direction of the vehicle, of the shoe body 3a. Since the overhead line may occasionally come off the top of the shoe body 3a sideways when the railway vehicle is traveling through a point, these respective frame rods 8 are provided to bring the overhead line back up to the top of the shoe body 3a as the railway vehicle travels in the case where the overhead line has come off.

The collector shoe device of the present embodiment described above is used in a state where the middle section of the bottom surface of the shoe body 3a is supported on an upper end section of the pantograph frame, not shown in the drawing, and the overhead line is made to slide on the top surface of the slider 7a. When the vehicle is traveling normally, of the respective slider elements 34a and 34b that construct the slider 7a, this overhead line slides on the top surface of one of those that are supported and fixed on the top surfaces of the center support member 12 and the end section support members 13. The times when the overhead line slides on the top surfaces of the slider elements 34a on both of the ends that are supported and fixed on the top surface of the support wall section 23 of the support frame 10 occur only when the vehicle is traveling through a point or traveling at a low speed. When the vehicle is traveling normally (at high speed), the overhead line slides only on one or two of the slider elements 34b among the respective slider elements 34b supported and fixed on the top surfaces of the center support member 12 and the respective end section support members 13. That is to say, in most cases, the overhead line slides on the top surface of either one or two slider elements 34b.

In the case where the vertical position of this overhead line has finely changed in this state, the slider element 34b that slides with this overhead line rises due to an elastic force of the center support member 12 and due to an elastic force of the respective compression coil springs 31 provided between both of the bottom surfaces of the center support member 12 and respective end section support members 13, and the top surface of the support frame 10, or it goes down resisting the elastic force of the center support member 12 and the elastic force of the compression coil springs 31. That is to say, the top surface of the slider element 34b that constructs the slider 7b shifts in the vertical direction in response to the movement of the overhead line, due to the elastic deformation of the center support member 12 that constructs the slider support body 9 and the elastic deformation of the respective compression coil springs 31. Moreover, at this time, the end section support member 13 oscillates as necessary about the second connecting shaft 21 that is provided between itself and the support frame 10 fixed on the shoe body 3a, and the center support member 12 is thereby allowed to rise and fall with respect to the shoe body 3a.

Figure 20:
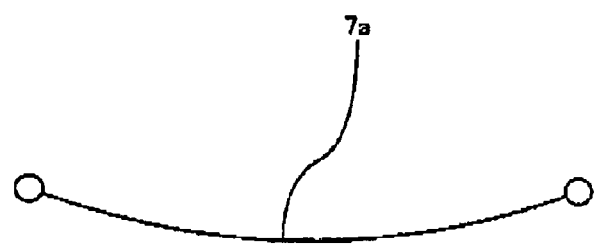
FIG. 20 is an exaggerated schematic front view showing a slider in a state of being elastically deformed due to a load applied by an overhead line.

In the case of the present embodiment described above, tracking performance does not decrease, as with the construction shown in FIG. 20 mentioned above, when the overhead line is positioned in the proximity of both of the end sections of the slider 7a. That is to say, not only in the case where the overhead line is positioned in the lengthwise direction center of the slider 7b but also in the case where it is positioned on both of the end sections in the lengthwise direction of this slider 7b, the slider 7b can track the movement of the overhead line due to the elastic deformation of the center support member 12 and on the rising and falling of the center support member 12 with respect to the shoe body 3a. Furthermore, when the slider 7b tracks the movement of the overhead line like this, since the shoe body 3a and also the upper frame of the pantograph that supports this shoe body 3a do not need to rise and fall at the same time together with this slider 7b, the inertial mass is not large.

That is to say, in the case where any one of the slider elements 34b that slides against this overhead line shifts in the vertical direction due to the contact with the overhead line, the center support member 12 (respective end section support members 13 if necessary) and the other slider elements 34b supported and fixed on the top surface of this center support member 12 (respective end section support members 13 if necessary) also slightly rise and fall. However, even in such case, the inertial mass of the rising and falling portion is significantly smaller than the inertial mass of a combination of the entire slider 7b and the shoe body 3a. As a result, the tracking performance of the slider 7b on the overhead line can be improved while retaining good contact performance between the overhead line and the slider 7b.

In general, the slider that constructs a collector shoe device is often divided into two in the traveling direction of the railway vehicle. Accordingly, in the case of carrying out the present invention also, the respective slider elements 34a and 34b may be divided into two in the traveling direction as necessary.

INDUSTRIAL APPLICABILITY

The present invention is to ensure a contact capacity between a slider and an overhead line in a high speed railway vehicle, and is expected to be utilized in the fields of manufacturing and use of a high speed railway vehicle with a purpose of further improving performance of a high speed railway vehicle.

The invention claimed is:
1. A collector shoe device provided with: a shoe body supported on an upper end section of a pantograph in a crosswise direction of a vehicle; a slider support body arranged above the shoe body in the crosswise direction of the vehicle along the shoe body; and a slider, which is supported and fixed on a top surface of the slider support body, and the top surface of which comes in contact with an overhead line, the slider support body comprising a center support member that is long in the crosswise direction of the vehicle, and a pair of end section support members arranged on both of the lengthwise direction end sections of the center support member, the center support member elastically deforming downward in the vertical direction across the lengthwise direction due to a load applied due to the contact between the overhead line and the slider, thereby allowing the top surface of the slider to shift in the vertical direction with respect to the shoe body, and furthermore, both of the end sections of the center support member and an inner end section, in the crosswise direction of the vehicle, of each of the end section support members being connected by a first connecting shaft arranged in the traveling direction of the vehicle, allowing them to oscillate and shift freely, and a support frame supported on the shoe body and an outer end section, in the crosswise direction of the vehicle, of each of the end section support members being connected by a second connecting shaft arranged in the travelling direction of the vehicle, allowing them to oscillate and shift freely, the both end sections of the center support member being supported so as to allow free oscillation on the shoe body via the respective end section support members, thereby allowing the entire center support member to rise and fall freely with respect to the shoe body, and the center support member provided with a rising and falling shaft in parallel with the first and second connecting shafts, this rising and falling shaft being movably fitted so as to rise and fall freely in a guide hole of the support frame supported by the shoe body.

2. A collector shoe device according to claim 1, wherein between both of the center support member and respective end section support members that construct the slider support body, and the shoe body, there are provided elastic members that push the center support member and the respective end section support members upward.

3. A collector shoe device according to either one of claim 1 and claim 2, wherein the slider comprises a plurality of slider elements that are divided in the crosswise direction of the vehicle and are arranged in series in this crosswise direction, and these respective slider elements are supported and fixed on the top surfaces of the center support member and the respective end section support members that construct the slider support member.

4. A collector shoe device according to claim 3, wherein the plurality of slider elements are supported and fixed on the top surfaces of the center support member, and due to the elastic deformation of this center support member, the respective top surfaces of the respective slider elements are shifted in the vertical direction with respect to the shoe body.

* * * * *